United States Patent
Dong et al.

(10) Patent No.: US 10,785,924 B2
(45) Date of Patent: Sep. 29, 2020

(54) DEFROSTING MACHINE COLUMN FIXED SUPPORT WITH INCLINED FLAT LEG

(71) Applicant: JiangSu University, Jiangsu (CN)

(72) Inventors: Lili Dong, Jiangsu (CN); Jun Yao, Shanghai (CN); Li Ma, Jiangsu (CN)

(73) Assignee: JiangSu University, Jiangsu (CN)

( * ) Notice: Subject to any disclaimer, the term of this patent is extended or adjusted under 35 U.S.C. 154(b) by 200 days.

(21) Appl. No.: 16/079,092

(22) PCT Filed: Apr. 21, 2017

(86) PCT No.: PCT/CN2017/081390
§ 371 (c)(1),
(2) Date: Aug. 22, 2018

(87) PCT Pub. No.: WO2017/193791
PCT Pub. Date: Nov. 16, 2017

(65) Prior Publication Data
US 2019/0059243 A1 Feb. 28, 2019

(30) Foreign Application Priority Data

May 9, 2016 (CN) .......................... 2016 1 0300440

(51) Int. Cl.
*A01G 13/06* (2006.01)
*F16M 11/22* (2006.01)
*A01G 13/08* (2006.01)

(52) U.S. Cl.
CPC ............. *A01G 13/06* (2013.01); *A01G 13/08* (2013.01); *F16M 11/22* (2013.01)

(58) Field of Classification Search
CPC ...... A01G 13/06; A01G 13/065; A01G 13/08; E04H 17/20; E04H 17/22
See application file for complete search history.

(56) References Cited

U.S. PATENT DOCUMENTS 278,220 A * 5/1883 Carson .................. E04F 11/181
256/21
2,522,935 A * 9/1950 Farrall .................. A01G 13/06
126/59.5

(Continued)

FOREIGN PATENT DOCUMENTS

CN 202282965 6/2012
CN 204409131 6/2015

(Continued)

OTHER PUBLICATIONS

"International Search Report (Form PCT/ISA/210)", dated Jul. 12, 2017, with English translation thereof, pp. 1-4.

*Primary Examiner* — Kristen C Hayes
(74) *Attorney, Agent, or Firm* — JCIPRNET

(57) ABSTRACT

The prevent invention discloses a defrosting machine column fixed support with an inclined flat leg, including a defrosting machine (1), a connecting support (2), a pedestal bolt (3), and a pedestal (4). The connecting support (2) includes an anti-tilting guide barrel (21), a fixed pillar (22), a rib plate (23), and a connecting plate (24). The pedestal (4) includes a pedestal plate (41) and a flat leg (42). The pedestal bolt (3) is used for fixedly connecting the connecting support (2) with the pedestal (4). The pedestal plates are hit into the soil so as to solve digging difficulties and low efficiency of a small diameter mounting deep hole with high accuracy requirements; each pedestal plate is respectively vertically provided with two intersecting flat legs in an inclined mode, thus balancing forces in each direction and stabilizing the defrosting machine column. The holes on the pedestal plates can integrate the soils on the inner side and outer side and two sides into one body, thus stabilizing the defrosting machine. In addition, the connecting support is employed, and standard tubes replace conventional non-standard tubes, thus saving on material cost, and transport and storage are (Continued)

also convenient. The support is simple in structure, convenient to implement, can be applied on pebbled land, not only reduces labour intensity when mounting, but also improves the anti-sinking, anti-horizontal torsion and anti-tilting abilities of the defrosting machine column, improves defrosting machine work reliability, and improves mounting efficiency and economic benefits of the defrosting machine.

7 Claims, 5 Drawing Sheets

(56) References Cited

U.S. PATENT DOCUMENTS

| | | | | |
|---|---|---|---|---|
| 3,288,358 | A * | 11/1966 | Alva | F04D 25/02 |
| | | | | 416/110 |
| 10,641,001 | B2 * | 5/2020 | Dong | E04H 12/2261 |
| 2012/0079779 | A1 | 4/2012 | Yasher et al. | |
| 2013/0312340 | A1 * | 11/2013 | Miller | E04H 17/22 |
| | | | | 52/169.13 |
| 2019/0186677 | A1 * | 6/2019 | Dong | A01G 13/06 |
| 2019/0208716 | A1 * | 7/2019 | Dong | E04H 12/2215 |

FOREIGN PATENT DOCUMENTS

| | | |
|---|---|---|
| CN | 105941024 | 9/2016 |
| DE | 102012200860 | 7/2013 |
| JP | H08242707 | 9/1996 |

* cited by examiner

DEFROSTING MACHINE COLUMN FIXED SUPPORT WITH INCLINED FLAT LEG

CROSS-REFERENCE TO RELATED APPLICATION

This application is a 371 application of the international PCT application serial no. PCT/CN2017/081390, filed on Apr. 21, 2017, which claims the priority benefit of China application no. 201610300440.8, filed on May 9, 2016. The entirety of each of the above-mentioned patent applications is hereby incorporated by reference herein and made a part of this specification.

TECHNICAL FIELD

The present invention relates to a device for the defrosting machine column, which relates to the fixed equipment and method of the stand column of the tea (fruit) garden defrosting machine, which is mainly applied to a tea (fruit) garden and belongs to the technical field of agricultural machinery.

BACKGROUND ART

China has a long history of tea planting and drinking. The growth and development of tea trees requires a warm and moist climate. The germination of tea buds in early spring is easy to be affected by the cold spell in later spring, which reduces the quality and production. In recent years, research on tea tree defrosting technology has been carried out rapidly in China. The research shows that the defrost protection effect can be achieved by using the defrosting machine to conduct the airflow disturbance from top to bottom.

At present, the commonly used fixing methods of the defrosting machine columns are as below. (1) Manual digging the pit of a certain depth in the location of the installation of defrosting machine pouring concrete in the pit, with the top of the concrete anchor bolt is placed, the column bottom flange by anchor bolt is fixed on the concrete foundation. The disadvantage of this method is that the labor intensity is high and the installation efficiency of the defrosting machine is low. (2) Using tools, digging the pit of a certain depth and diameter is slightly bigger than the column diameter of hole in the location of the installation of defrosting machine, the defrosting machine column is placed in the pit and keep the defrosting machine column body upright, fill it with soil or concrete after adjusting the direction. The disadvantage of this method is that: in order to guarantee the defrosting machine column vertical requirement, dig a pit by the diameter of only slightly bigger than the column diameter, due to the late embed hard to eliminate the gap between soil and columns, the gap will further increase due to defrosting machine in the process of using machine vibration and by wind, and suffered severely reduces the safe usage of defrosting machine performance and work efficiency. To solve the problem of high labor intensity and low efficiency of digging small diameter deep pit, the present invention provides that the pedestal plate is driven into the soil to replace the deep pit fixing defrosting machine, which greatly reduces the labor intensity and improves the installation efficiency of the defrosting machine. In addition, China's utility model patent CN201120394200.1 discloses a fixing device for the stand column of the plant defrosting machine, the set several root stand mechanisms in bottom of the stand column. The root stand mechanisms include the steel root beam transverse bending into trough type and the u-shaped hoop, a pair of positioning rods equipped with in the middle of the steel root beam, and the lower part of the column positioned between a bunch of positioning rods, which are fixed vertically to the steel root beam through the u-shaped hoop. This method requires digging bigger and deeper pits, increasing the labor intensity and low installation efficiency. In view of its disadvantages, the present invention provides a method to avoid digging a deep pit and simultaneously improve the fixed stability of the defrosting machine. The common feature of the above method is that it is necessary to dig a small diameter and high precision deep pit in the installation position of defrosting machine, and it is labor intensive, time consuming and costly. The present invention adopts the method of driving the pedestal plate into the soil to avoids the work of digging deep pits, reduce the labor intensity, and improve the installation efficiency of the defrosting machine columns. The height of defrosting machine to the ground needs to reach 6.7 m to meet the defrost effect of the defrosting machine. Non-standard pipe is adopted in the previous defrosting machine column as the standard length of pipe is 6 m, which has a high cost. The use of the connecting support provided by the present invention can make the defrosting machine column adopt standard pipe material, which can save 50% of the fabricating cost.

SUMMARY OF THE INVENTION

The purpose of the present invention is to provide a defrosting machine column fixed support with inclined flat leg suitable for pebbled land, simple structure and convenient installation. Reduce the labor intensity and the installation time of the installation process of the defrosting machine, and effectively prevent rotation and tilt of the defrosting machine column, reduce manufacturing and installation costs, improve economic efficiency, and facilitate to transportation and storage.

The technical solutions of the present invention are as follows. A defrosting machine column fixed support with inclined flat leg, includes a defrosting machine 1, a connecting support 2, a pedestal bolt 3 and a pedestal 4. The connecting support 2 includes an anti-tilting guide barrel 21, a fixed pillar 22, a rib plate 23 and a connecting plate 24. An outer diameter of the anti-tilting guide barrel 21 is 0.5 mm-1 mm smaller than an inner diameter of the fixed pillar 22 and an inner diameter of the defrosting machine column 11, and the two ends of the anti-tilting guide barrel 21 are provided with chamfering to facilitate the installation of the anti-tilting guide barrel 21 and the defrosting machine 1; The defrosting machine is installed on the upper end of the connecting support 2, and a lower end of the defrosting machine column 11 is provided with small holes for the anti-tilting guide barrel 21 plug welding of the connecting support 2. The anti-tilting guide barrel 21 is installed into the fixed pillar 22 and into the defrosting machine column 11 with a length of more than 200 mm, and use plug welding fixation to enhance its anti-dumping ability. An outer diameter of the fixed pillar 22 is equal to an outer diameter of the defrosting machine column 11. The upper end of the fixed pillar 22 is provided with small holes for plug welding. An outer end of the connecting plate 24 is provided with 4 notches for installing the pedestal bolt 3, and the pedestal bolt 3 is used to connect the connecting support 2 and the pedestal 4. During the assembly, the anti-tilting guide barrel 21 is first placed around 200 mm above the upper end of the fixed pillar 22. The anti-tilting guide barrel 21 and the fixed pillar 22 are fixed by the method of plug welding. The fixed pillar 22 is welded vertically in the center of the connecting plate 24, and the rib plate 23 is welded between the fixed pillar 22 and the connecting plate 24 to enhance the anti-torsion ability of the defrosting machine. The pedestal 4 includes a pedestal plate 41 and a flat leg 42. An inner side of the pedestal plate 41 is provided with an upper hole 43 and a lower hole 44, and an upper end of the pedestal plate 41 is provided with a hole for mounting the pedestal bolt 3, and an outer edge of the pedestal plate 41 is provided with flat holes arranged horizontally and in the opposite direction at a certain height. Dig a shallow pit in the corresponding position when installing the pedestals 4. Each of the pedestal plates 41 is punched into the soil 20-30 mm successively after the location of each of the pedestal plates 41 is determined. When the upper end of the lower hole 44 is close to the ground, the connecting ring will be stuck into the lower hole 44 of each pedestal plate 41 to fix each pedestal plate 41. Continue punching until upper hole 43 is close to the ground and the connecting ring is attached to the upper hole 43 of each pedestal plate 41. The flat leg 42 is then punched into the soil from the flat hole at the outer edge of the pedestal plate 41. The installation of the flat leg 42 is carried out by means of symmetrical installation. Punch two pieces of the flat legs 42 first along the outside perimeter of the same pedestal plate 41 in the opposite directions of flat holes into the soil on both sides of the pedestal plate 41, until the two holes at the upper ends of the flat leg 42 are respectively located on both sides of the pedestal plate 41. The bolt is inserted into the two holes of the flat leg 42 and screwed the nut, and then the flat leg 42 is mounted in the symmetrical position on the pedestal plate 41 in the same manner. The connecting support 2 is fixed on the pedestal 4 by using pedestal bolt 3 in a symmetrical installation after the installation of the pedestal 4 is completed. The connecting plate 24 is buried with soil after the installation of the pedestal bolt 3, thus it is safe and beautiful. Finally, the defrosting machine column 11 is put on the anti-tilting guide barrel 21, and the anti-tilting guide barrel 21 and the defrosting machine column 11 are fixed by the means of plug welding.

Preferably, the cross-sectional shape of the pedestal plate 4 is cross shape.

Preferably, the number of the pedestal bolts 4 is 4.

Preferably, the number of the flat legs 42 is 8.

Preferably, the upper hole 43 and the lower hole 44 are rectangular holes.

Preferably, the fixing methods between the anti-tilting guide barrel 21 and the fixed pillar 22, the anti-tilting guide barrel 21 and the defrosting machine column 11 are plug welding.

The defrosting machine column fixed support with inclined flat leg in the present invention has the advantage of simple structure and convenient installation, it not only reducing the labor intensity installing, raised the anti-torsion ability and anti-dumping ability, and increases the work reliability of defrosting machine, also can be applied to pebbled land. The use of connecting supports enables the standard pipe material to replace the non-standard pipe material, which was originally used to meet the height of the defrosting machine, can greatly save the fabricating cost, and facilitate to transportation and storage. At the same time, the installation efficiency and economic benefits of the defrosting machine are improved.

DETAILED DESCRIPTION OF THE EMBODIMENTS

Figure 1:
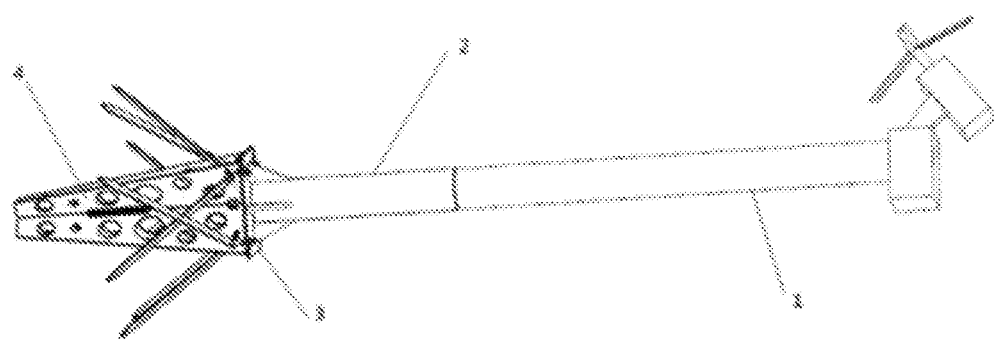
FIG. 1 is schematic overall installation structure view of the defrosting machine according to the present invention.

Referring to FIG. 1, this machine includes a defrosting machine 1, a connecting support 2, a pedestal bolt 3 and a pedestal 4. The combined installation method meets the height requirement and the reliability requirement of defrosting machine. The defrosting machine 1 is mounted on the anti-tilting guide barrel 21 of the connecting support 2 by the defrosting machine column 11, and the defrosting machine 1 is fixed to the connecting support 2 by plug welding. The connecting support 2 and the pedestal 4 are fixed by the pedestal bolt 3.

Figure 2:
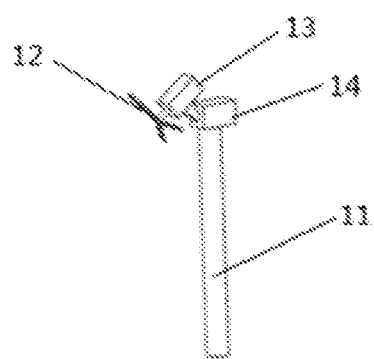
FIG. 2 is schematic structure view of the defrosting machine according to the present invention.
Figure 3:
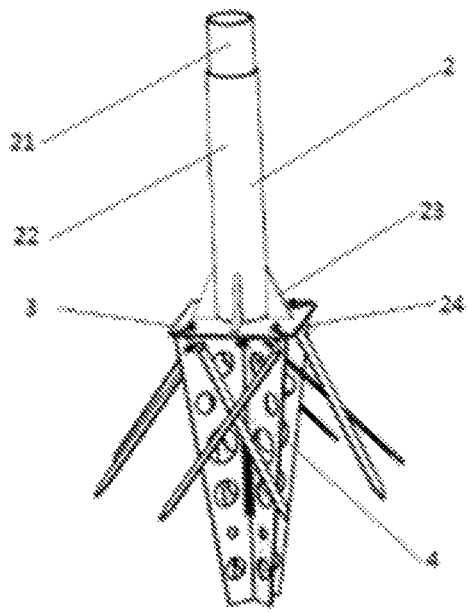
FIG. 3 is schematic installation structure view of the connecting support and pedestal according to the present invention.

Referring to FIG. 2, the defrosting machine includes a defrosting machine column 11, a defrosting machine blade 12, a defrosting machine motor 13 and a defrosting machine connection portion 14. The length of the defrosting machine column 11 is 6 m.

Figure 4:
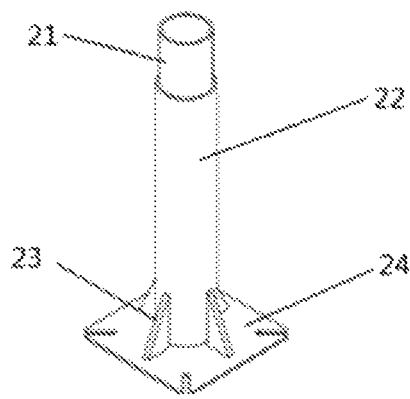
FIG. 4 is schematic structure view of the connecting support according to the present invention.
Figure 5:
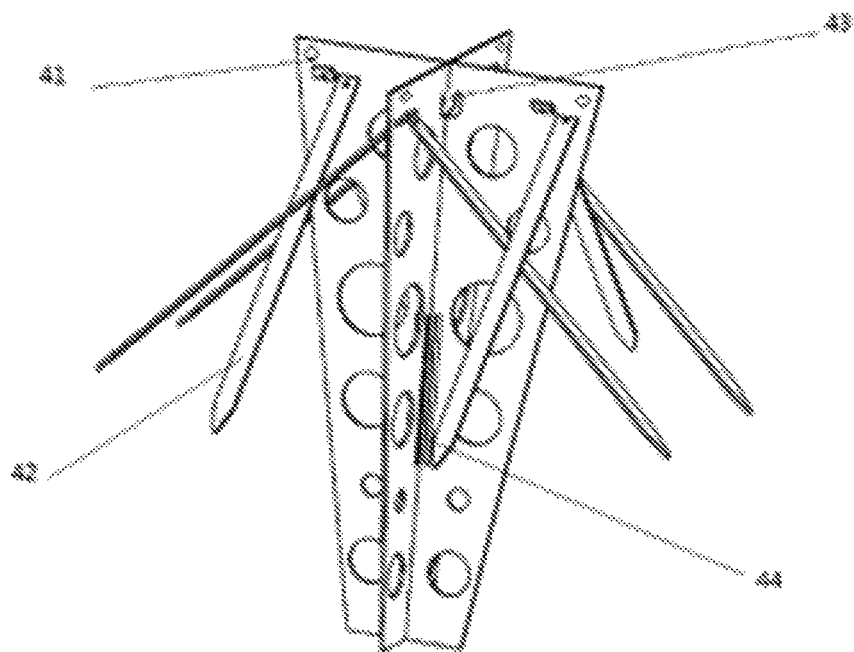
FIG. 5 is schematic installation structure view of the pedestal plate according to the present invention.
Figure 6:
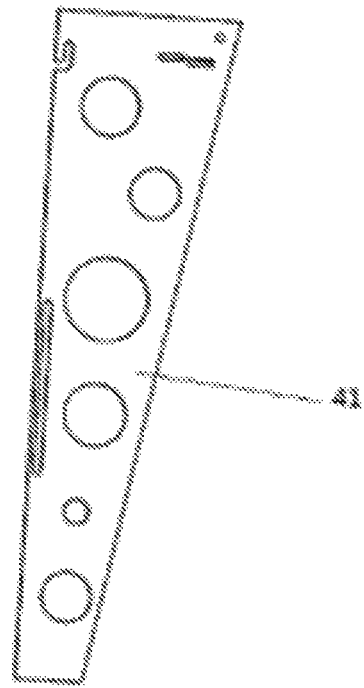
FIG. 6 is schematic structure view of the pedestal plate according to the present invention.
Figure 7:
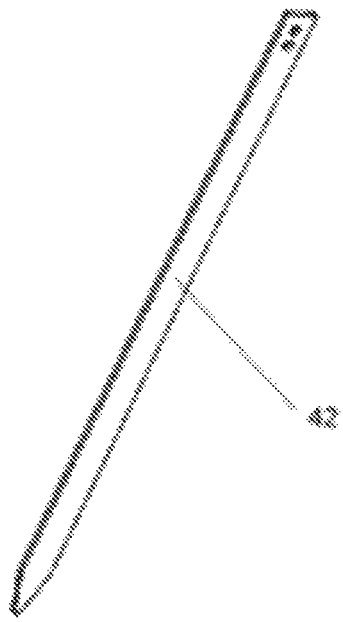
FIG. 7 is schematic structure view of the flat leg according to the present invention.
Figure 8:
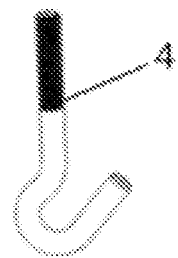
FIG. 8 is schematic structure view of the pedestal bolt according to the present invention.

Referring to FIG. 4, the connecting support 2 includes an anti-tilting guide barrel 21, a fixed pillar 22, a rib plate 23 and a connecting plate 24 fixed to each other. The outer diameter of the anti-tilting guide barrel 21 is 0.5-1 mm smaller than the inner diameter of the fixed pillar 22, and the upper end of the fixed pillar 22 has 2 or 3 groups of small holes. Firstly, the anti-tilting guide barrel 21 is inserted into the upper end of the fixed pillar 22 around 200 mm, the anti-tilting guide barrel 21 and the fixed pillar 22 are fixed by the method of plug welding. Secondly, the fixed pillar 22 is welded vertically in the center of the connecting plate 24. Lastly, the rib plate 23 is welded between the fixed pillar 22 and the connecting plate 24 to enhance anti-dumping ability of the fixed pillar 22.

Referring to FIG. 4, the pedestal 4 includes a pedestal plate 41, a flat leg 42, and so on. The pedestal plate 41 is a wedge-shaped steel plate with holes in the upper end, inner side and outer edges. The upper end hole is used for the installation of pedestal bolt 3, the inner upper hole 43 and the inner lower hole 44 are used for the installation of the connecting ring, and the outer edge hole is used for installation of flat leg. The upper end of the flat leg 42 has two holes for mounting bolts to fix the flat leg 42 on the pedestal plate 41.

The structure, functionality, and processing of the current invention are further described below with reference to the accompanying drawings and the concrete implementation examples. However, the protective range of this present invention includes but not limited to that.

A defrosting machine column fixed support with an inclined flat leg according to the present invention, can overcome the difficulties of the high precision of digging aperture, small diameter deep hole and the backfill compaction in the commonly used fixed installation methods of the defrosting machine by punching the pedestal 4 into the soil, and reduces the labor intensity and improves installation efficiency. The use of connecting support enables the standard pipe material to replace the non-standard pipe material, which was originally used to meet the height of the defrosting machine, can greatly save the fabricating cost, and facilitate to transportation and storage. The hole in the pedestal plate connects the soil inside and outside the pedestal into a whole, which enhances the stability of the pedestal and reduces the damage to the soil. The present invention provides a device which can be used for fixing the defrosting machine column.

The installation process of the defrosting machine is as follows. Firstly, dig a shallow pit in the corresponding installation position. Secondly, the pedestal plates 41 are spliced together and formed. Thirdly, each of the pedestal plates 41 is punched into the soil 20-30 mm successively after the location of each of the pedestal plates 41 is determined. Fourthly, when the upper end of the lower hole 44 is close to the ground, the connecting ring will be stuck into the lower hole 44 of each of the pedestal plates 41 to fix the pedestal plates 41. Fifthly, continues punching until the upper hole 43 is close to the ground and the connecting ring is attached to the upper hole 43 of each of the pedestal plates 41. Sixthly, the flat leg 42 is punched into the soil from the flat hole at the outer edge of the pedestal plate 41, the installation of the flat leg 42 is carried out by means of symmetrically. Punching two pieces of the flat legs 42 along the outside perimeter of the same pedestal plate 41 in the opposite directions of the flat holes into the soil on both sides of the pedestal plate 41 until the two holes at the upper ends of the flat leg 42 are respectively located on both sides of the pedestal plate 41, the bolt is inserted into the two holes of the flat leg 42 and screwed the nut. Seventhly, the flat leg 42 is mounted in the symmetrical position on the pedestal plate 41 in the same manner. Eighthly, the connecting support 2 is fixed on the pedestal 4 by using the pedestal bolt 3 after the installation of the pedestal 4 is completed, the connecting plate 24 is buried with soil to level the land. Finally, the defrosting machine column 11 is put on the anti-tilting guide barrel 21, and the anti-tilting guide barrel 21 and the defrosting machine column 11 are fixed by the means of plug welding. The outer diameter of the anti-tilting guide barrel 21 is 0.5-1 mm smaller than the inner diameter of the defrosting machine column 11 and to enhance its ability of the anti-bending, anti-dumping and anti-horizontal torsion and reduce vibration. The outer diameter of the defrosting machine column 11 is equal to the outer diameter of the fixed pillar 22, which can make the appearance beautiful.

The embodiments are preferred implementation manners of this present invention, however, this present invention includes but not limited to the foregoing implementation manners. Any obvious improvements, replacements or variations that can be made by a person skilled in the art without departing from the substantial content of the present invention fall within the protection scope of the present invention.

What is claimed is:

1. A defrosting machine column fixed support with an inclined flat leg, this machine comprising: a defrosting machine, a connecting support, a pedestal bolt, and a pedestal, wherein the connecting support comprises an anti-tilting guide barrel, a fixed pillar, a rib plate, and a connecting plate fixed to each other, the pedestal comprises a pedestal plate and a flat leg, and the pedestal bolt is used for fixedly connecting the connecting support with the pedestal.

2. A defrosting machine column fixed support with an inclined flat leg according to claim 1, wherein the outer diameter of the anti-tilting guide barrel is 0.5-1 mm smaller than the inner diameter of the fixed pillar and the inner diameter of the defrosting machine column, and the outer diameter of the fixed pillar is equal to the outer diameter of the defrosting machine column, so as to make the defrosting machine column easy to process and install, make aesthetic appearance, and also effectively ensure the reliability of the connection between the three.

3. A defrosting machine column fixed support with an inclined flat leg according to the claim 1, wherein two ends of the anti-tilting guide barrel are provided with chamfering to facilitate the installation of the anti-tilting guide barrel and the defrosting machine, the anti-tilting guide barrel is installed into the fixed pillar and into the defrosting machine column with a length of more than 200 mm, and is fixed with plug welding, plug holes are 2 or 3 groups to enhance its anti-dumping ability, at the same time enhance aesthetic appearance.

4. A defrosting machine column fixed support with an inclined flat leg according to the claim 1, wherein the pedestal plate comprises holes, soils on inner side and outer side of the pedestal plate are integrated into one body through the holes of the pedestal plate, so as to stabilize the pedestal.

5. A defrosting machine column fixed support with an inclined flat leg according to the claim 1, wherein the cross-section of the pedestal is cross shape or Y shape.

6. A defrosting machine column fixed support with an inclined flat leg according to the claim 4, wherein the holes with different functions on pedestal plate are used to install connecting ring, the flat leg and the pedestal bolt.

7. A defrosting machine column fixed support with an inclined flat leg according to the claim 5, wherein upper end of the flat leg has two holes, when hole on the outer edge of the pedestal plate is close to the ground, two said flat legs are drilled into the soil along holes in the opposite direction until the two holes at the upper end of the flat leg are located on both sides of the pedestal plate, subsequently the flat leg and the pedestal plate are fixed with bolts in the two holes of the upper end of the flat leg, after the flat leg on the pedestal plate is installed, the flat leg on its symmetrical pedestal plate is installed.

* * * * *